(12) United States Patent
Klepack et al.

(10) Patent No.: US 8,562,241 B2
(45) Date of Patent: Oct. 22, 2013

(54) UNIVERSAL FRAMING CHANNEL MOUNTING BRACKET

(75) Inventors: Daniel J. Klepack, Commerce, MI (US); Donald LeCroy, Mableton, GA (US)

(73) Assignee: Jervis B. Webb Company, Farmington Hills, MI (US)

( * ) Notice: Subject to any disclaimer, the term of this patent is extended or adjusted under 35 U.S.C. 154(b) by 407 days.

(21) Appl. No.: 12/783,605

(22) Filed: May 20, 2010

(65) Prior Publication Data

US 2010/0296860 A1    Nov. 25, 2010

Related U.S. Application Data

(63) Continuation-in-part of application No. 12/470,642, filed on May 22, 2009, now abandoned.

(51) Int. Cl.
F16B 9/00    (2006.01)
(52) U.S. Cl.
USPC .......................... 403/262; 198/860.1
(58) Field of Classification Search
USPC ............... 403/24, 205, 231, 240, 252–254, 403/259–262, 403; 52/301, 632, 710, 831; 198/860.1, 861.1; 414/790.6
See application file for complete search history.

(56) References Cited

U.S. PATENT DOCUMENTS

| | | | |
|---|---|---|---|
| 2,345,650 A | | 4/1944 | Attwood |
| 2,589,228 A | * | 3/1952 | Cordis .......................... 119/334 |
| 3,017,153 A | * | 1/1962 | Johnson ...................... 248/188.8 |
| 3,581,877 A | * | 6/1971 | Goldberg .................... 198/836.1 |
| 3,604,563 A | * | 9/1971 | Ronan, Jr. ...................... 209/518 |
| 3,888,441 A | | 6/1975 | Rebentisch |
| 4,018,020 A | * | 4/1977 | Sauer et al. ...................... 52/241 |
| 4,068,440 A | * | 1/1978 | Lillethorup ...................... 52/301 |
| 4,130,977 A | * | 12/1978 | Taylor et al. .................... 52/710 |
| 4,342,177 A | | 8/1982 | Smith |
| 4,736,835 A | * | 4/1988 | Hinkle ........................ 198/860.1 |
| 4,778,092 A | | 10/1988 | Grace |
| 4,784,552 A | | 11/1988 | Rebentisch |
| 4,787,767 A | * | 11/1988 | Wendt ........................... 403/187 |
| 4,789,286 A | | 12/1988 | Laput |
| 4,822,199 A | | 4/1989 | Nehls |
| 4,830,531 A | | 5/1989 | Condit et al. |
| 4,840,525 A | | 6/1989 | Rebentisch |
| 4,895,331 A | | 1/1990 | Nehls |
| 4,919,056 A | * | 4/1990 | Gronau .................... 104/130.07 |
| 4,926,592 A | | 5/1990 | Nehls |
| 4,948,313 A | * | 8/1990 | Zankovich ....................... 411/85 |
| 5,160,107 A | * | 11/1992 | Perrault et al. ................ 248/327 |

(Continued)

*Primary Examiner* — Gregory Binda
*Assistant Examiner* — Nahid Amiri
(74) *Attorney, Agent, or Firm* — Dickinson Wright PLLC (57) ABSTRACT

An attachment system for securing conveyor components to a conveyor disposed between a pair of side guards. The side guards are U-shaped and have first and second side guard ends that extend perpendicularly from the opposite ends of a flat wall portion to a distal end. The first side guard end includes a first lip that defines a grooved portion. At least one framing channel extending between flat first and second channel ends is disposed between the first and second side guard ends. The first channel end includes a projection portion that extends from the first channel end to engage to the grooved portion to secure the first channel end adjacent the first side guard end. At least one tab extends outwardly from the second channel end to engage an end guard opening defined in the second side guard end to secure the framing channel to the side guard.

11 Claims, 7 Drawing Sheets

(56) References Cited

U.S. PATENT DOCUMENTS

| | | | | |
|---|---|---|---|---|
| 5,174,532 A | * | 12/1992 | Huang | 248/188.1 |
| 5,178,263 A | * | 1/1993 | Kempen | 198/836.1 |
| 5,188,479 A | | 2/1993 | Nehls | |
| 5,228,252 A | | 7/1993 | Nehls | |
| 5,297,888 A | | 3/1994 | Nehls | |
| 5,307,600 A | | 5/1994 | Simon, Jr. et al. | |
| 5,314,156 A | | 5/1994 | Moses | |
| 5,351,926 A | | 10/1994 | Moses | |
| 5,414,967 A | | 5/1995 | Cates et al. | |
| 5,762,178 A | * | 6/1998 | Tarlton | 198/860.2 |
| 6,343,446 B1 | | 2/2002 | Beard | |
| 6,427,831 B1 | * | 8/2002 | Norton | 198/841 |
| 6,830,146 B1 | * | 12/2004 | Scully et al. | 198/836.1 |
| 7,021,590 B2 | * | 4/2006 | Hoffmann | 248/49 |
| 7,178,665 B2 | * | 2/2007 | Ryan | 198/860.1 |
| 7,240,459 B2 | | 7/2007 | Daudet et al. | |
| 7,261,274 B2 | | 8/2007 | Vatsaas et al. | |
| 2001/0054545 A1 | * | 12/2001 | Csiki et al. | 198/860.1 |
| 2002/0116891 A1 | * | 8/2002 | Waldrop | 52/632 |
| 2002/0148709 A1 | * | 10/2002 | Claig et al. | 198/860.1 |
| 2004/0262120 A1 | * | 12/2004 | LeCroy | 193/30 |
| 2006/0237292 A1 | * | 10/2006 | Ryan | 198/860.1 |
| 2008/0041693 A1 | * | 2/2008 | Schmidt et al. | 198/327 |
| 2008/0072525 A1 | * | 3/2008 | Becker et al. | 52/710 |
| 2008/0229699 A1 | | 9/2008 | Nehls | |

* cited by examiner

UNIVERSAL FRAMING CHANNEL MOUNTING BRACKET

CROSS REFERENCE TO RELATED APPLICATION

This utility patent application is a continuation-in-part of U.S. patent application Ser. No. 12/470,642 filed May 22, 2009, entitled "Universal Framing Channel Mounting Bracket", the entire disclosure of the application being considered part of the disclosure of this application, and hereby incorporated by reference.

BACKGROUND OF THE INVENTION

1. Field of the Invention

The subject invention relates to an attachment system for securing conveyor components to a conveyor.

2. Description of the Prior Art

Conveyors of numerous designs have been used in the past to transport articles from one area to another. Known conveyors have employed endless belts, segmented slats, slider beds and other elements to move objects along their path of transport. During the field installation phase of conveyor systems, it is often necessary to add attachment points, typically unistrut type "framing channel", to the conveyor side guards or frame. In addition to providing structural support to the conveyor system, these attachment points are used to secure wiring conduit, control boxes, photocell brackets, motor control devices, etc., to the conveyor side guards. Because conveyors are installed in unique locations and applications, providing all factory installed attachment points is not practical. Factory installed attachment points add additional weight, materials and cost to the conveyor system and may not be needed at every location a conveyor system is installed.

It is known in the art to have short sections of framing channel that are welded in the field at the required location to attach field mounted components. Such known processes involve grinding off the powder coat paint to provide a welding surface, then welding the framing channel to the conveyor followed by touch up painting. This field work is time consuming and adds additional cost to the installation of the conveyor system.

SUMMARY OF THE INVENTION

In view of the above, the present invention is directed to an attachment system for securing conveyor components to a conveyor that is disposed between a pair of side guards or frames. The system includes at least one side guard that is U-shaped and has first and second side guard ends that extend perpendicularly from the opposite ends of a flat wall portion to a distal end. The first side guard end includes a first lip that extends from the distal end of the first side guard end to define a grooved portion. The second side guard end includes at least one end guard opening defined therein. At least one framing channel that defines a channel portion extends between first and second channel ends and is disposed between the first and second side guard ends. The first channel end includes a projection portion that extends from the first channel end to engage to the grooved portion to secure the first channel end adjacent the first side guard end. At least one tab extends outwardly from the second channel end to engage the end guard opening to secure the framing channel to the side guard.

The present invention is further directed to a method for securing conveyor components to a conveyor that is disposed between a pair of side guards. To begin, at least one tab extending outwardly from the second channel end is angularly inserted into the end guard opening. The first channel end is then moved angularly towards the first side guard end while the at least one tab remains in the end guard opening of the second side guard end. Next, a biasing adaptor is angularly inserted into the grooved portion to secure a portion of the biasing adaptor within the grooved portion. Finally, the biasing adaptor is secured to the framing channel to secure the framing channel to the side guard.

The present invention provides for a universal framing channel that can be attached with no welding or touch up painting. The framing channel may be supplied in various lengths to accommodate various side guard heights and can be field mounted at any location along the conveyor.

Further scope and applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims and the accompanying drawings in which:

DETAILED DESCRIPTION OF THE PREFERRED EMBODIMENT

Referring to the Figures, wherein like numerals indicate corresponding parts throughout the several views, an attachment system 20 for securing conveyor components to a conveyor 22 is generally shown.

Figure 1:
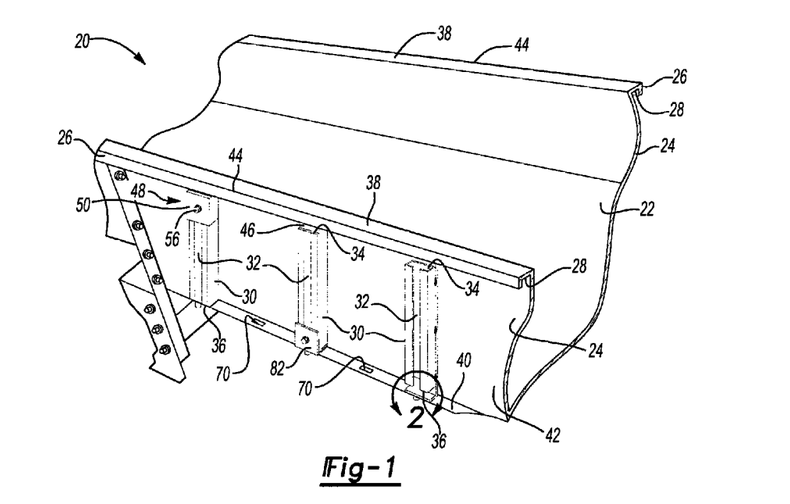
FIG. 1 is a partial perspective view of an exemplary conveyor system of the subject invention.

As shown in FIG. 1, a conveyor 22 is disposed between a pair of side guards 24 or contained within a frame having side walls. The side guards 24 or frame side walls are generally U-shaped and include a first lip 26 that defines a grooved portion 28 in the side guard 24. The conveyor components are secured to the side guard 24 by at least one framing channel 30 that defines a channel portion 32. The framing channel 30 extends between first and second channel ends 34, 36 that are disposed between first and second side guard ends 38, 40. The first channel end 34 of the framing channel 30 is adapted to correspond to the grooved portion 28 of side guard 24. The adapted first channel end 34 of the framing channel 30 is angularly inserted into the grooved portion 28 of the side guard 24. The second channel end 36 is angularly directed toward the second side guard end 40 to engage the second side guard end 40 while the adapted first channel end 34 of the framing channel 30 remains in the grooved portion 28. The second channel end 36 is then secured to the second side guard end 40 to lock the framing channel 30 to the side guard 24. Conveyor components are then are secured to the conveyor 22 via the framing channel 30. The conveyor components include, wiring conduit, control boxes, photocell brackets, motor control devices and any other conveyor component known in the art.

In the exemplary embodiment, the framing channel 30 includes a first channel end 34 configured to fit to the grooved portion 28 of the first side guard end 38. The second channel end 36 is mounted to the second side guard end 40 or lower return of the side guard 24 or conveyor frame. The second channel end 36 may be mounted to the second side guard end 40 with a bolt or by creating a tight fit between the second channel end 36 and the second side guard end 40. The framing channel 30 can accommodate nut plates or various clamps. The framing channel 30 is factory supplied and can be supplied in various lengths to accommodate various side guard 24 heights and can be field mounted at any location along the conveyor 22.

The system 20 includes at least one side guard 24 that is U-shaped and includes first and second side guard ends 38, 40 that extend perpendicularly from the opposite ends of a flat wall portion 42 to a distal end 44. The side guard 24 may be made of any material known in the art, including, but not limited to steel, aluminum, and plastic. The first side guard end 38 includes a first lip 26 that extends from the distal end 44 of the first side guard end 38 to define the grooved portion 28. The side guard 24 or frame wall may be any shape known in the art, as long it includes a grooved portion 28 in one of the side guard ends 38, 40.

As shown in FIG. 1, the system 20 includes at least one framing channel 30 that defines a channel portion 32 that extends between flat first and second channel ends 34, 36. In the exemplary embodiment, a plurality of framing channels 30 are secured to the side guard 24. The framing channel 30 may be made of any material known in the art, including, but not limited to steel, aluminum, and plastic. The framing channel 30 is disposed between the first and second side guard ends 38, 40. The first channel end 34 includes a projection portion 46 that extends from the first channel end 34 to engage to the grooved portion 28 of the side guard 24 to secure the first channel end 34 adjacent the first side guard end 38.

Figures 3, 4:
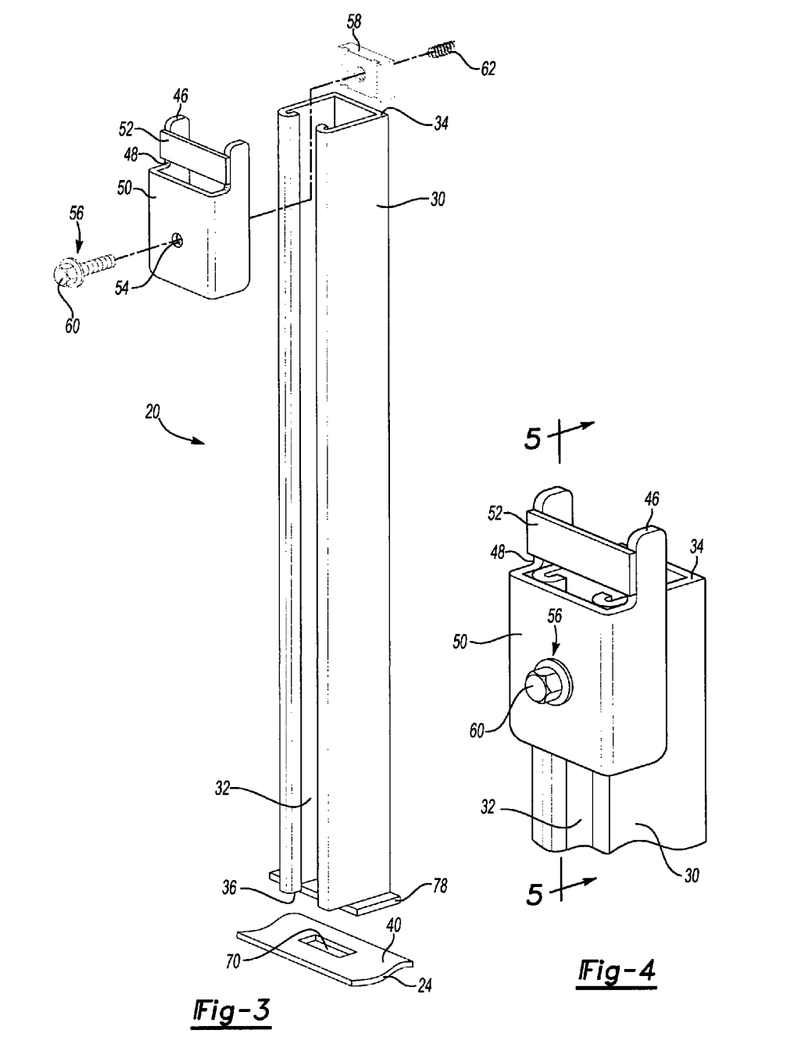
FIG. 3 is a perspective view of an exemplary framing channel of the subject invention.
FIG. 4 is a partial perspective view of an adaptor secured to the exemplary framing channel of FIG. 3.
Figure 5:
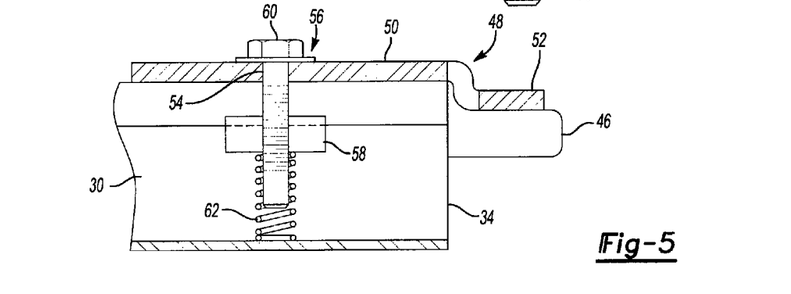
FIG. 5 is a cross-sectional view of the adaptor secured to the framing channel as shown in FIG. 4 along the line 5-5.

In an exemplary embodiment, as shown in FIGS. 3-5, the projection portion 46 is a two tiered adaptor 48 that includes a first adaptor portion 50 and a second adaptor portion 52. The first adaptor portion 50 defines an adaptor opening 54 and is secured to the framing channel 30 by an adaptor securing device 56. The second adaptor portion 52 extends from the first channel end 34 to engage to the grooved portion 28. The adaptor 48 may be made of any material known in the art, including, but not limited to steel, aluminum, and plastic. The adaptor securing device 56 includes an adaptor nut portion 58 and an adaptor bolt portion 60. The adaptor nut portion 58 is secured within the channel portion 32 of the framing channel 30. The adaptor bolt portion 60 extends through the adaptor opening 54 and engages the adaptor nut portion 58 to secure the adaptor 48 to the framing channel 30. The adaptor 48 may be secured to the framing channel 30 by any means known in the art. The adaptor nut portion 58 may be conventionally provided with a spring 62 to assist in assembly of the adaptor bolt portion 60 to the adaptor nut portion 58. The spring 62 biases the adaptor nut portion 58 to secure the adaptor nut portion 58 within the channel portion 32 of the framing channel 30. The adaptor 48 is movable along the framing channel 30 prior to securing the adaptor bolt portion 60 to the adaptor nut portion 58. This allows for the position of the adaptor 48 to be adjusted along the framing channel 30 to vary the overall length of the assembly to a desired length.

Figures 6, 7, 8:
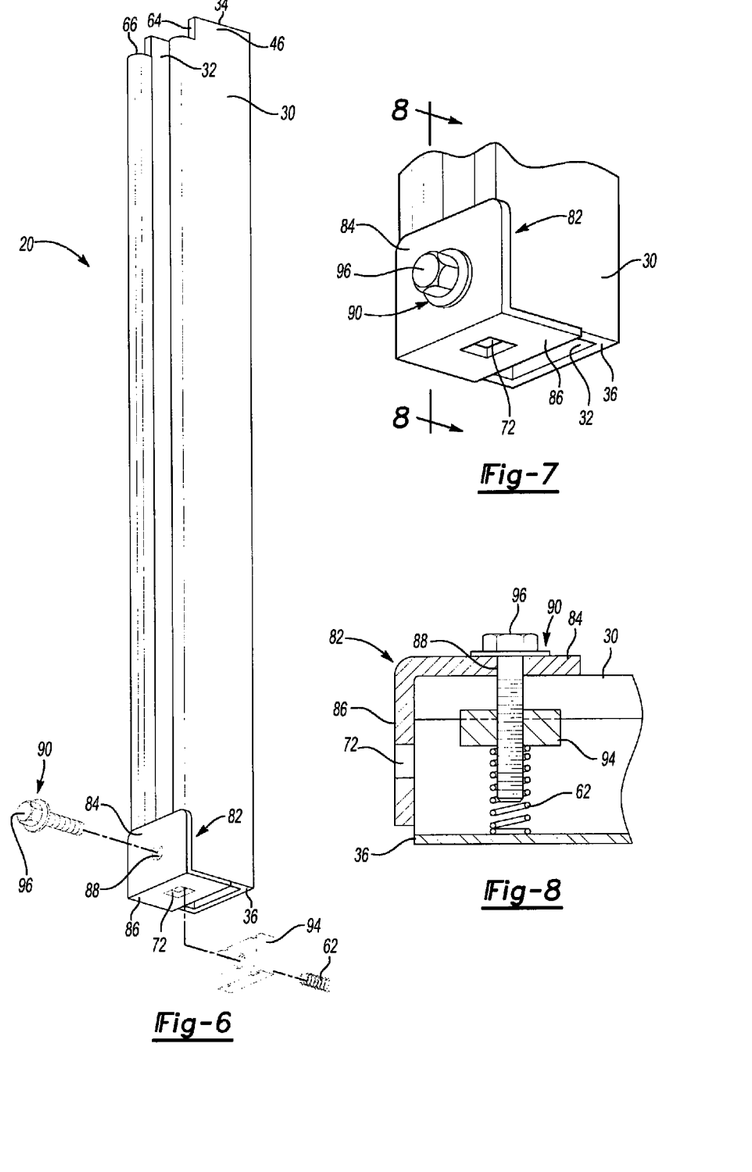
FIG. 6 is a perspective view of an exemplary framing channel of the subject invention.
FIG. 7 is a partial perspective view of an exemplary angle bracket secured to the exemplary framing channel of FIG. 6.
FIG. 8 is a cross-sectional view of the angle bracket secured to the framing channel as shown in FIG. 7 along the line 8-8.
Figure 9:
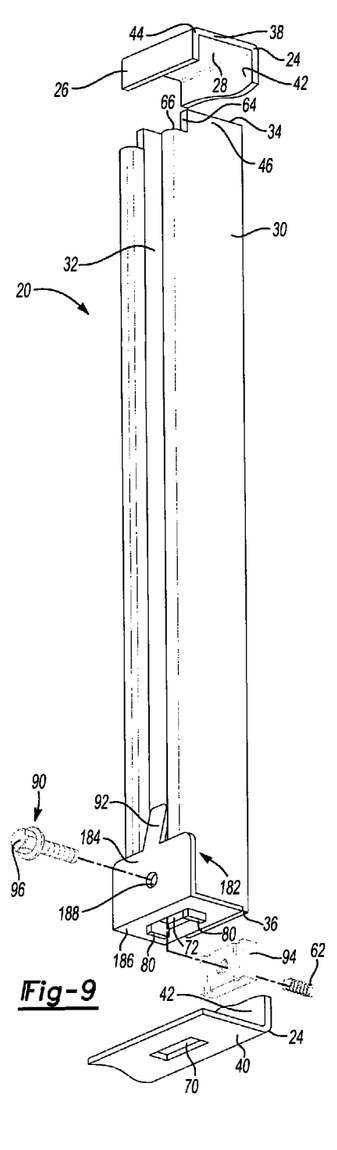
FIG. 9 is a perspective view of an exemplary framing channel of the subject invention.

In an alternative exemplary embodiment, as shown in FIGS. 6 and 9, the projection portion 46 may be a slot 64 that is defined by a notch 66 in the framing channel 30. The slot 64 may be formed by removing a section of the framing channel 30 to create the slot 64. The slot 64 engages the grooved portion 28 of the side guard 24 to secure the first channel end 34 adjacent the first side guard end 38.

Figures 11, 12, 13:
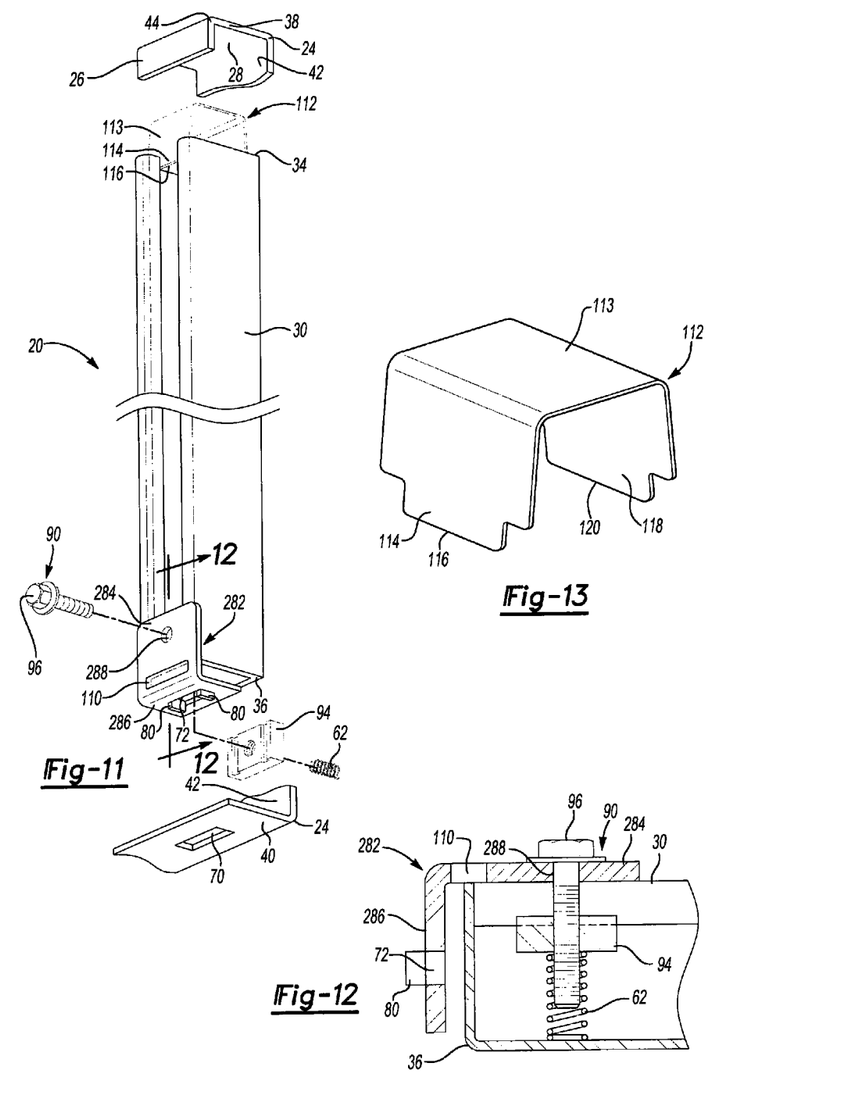
FIG. 11 is a perspective view of an exemplary framing channel of the subject invention.
FIG. 12 is a cross-sectional view of the angle bracket secured to the framing channel as shown in FIG. 11 along the line 12-12.
FIG. 13 is a perspective view of an insert used in the subject invention.

In an alternative exemplary embodiment, as shown in FIGS. 11 and 13, the projection portion 46 may be an insert 112 generally indicated that engages the first channel end 34 to mate the framing channel 30 to the first side guard end 38. The insert 112 may be made of any biasing material known in the art, including, but not limited to steel, aluminum, and plastic. In the exemplary embodiment, the insert 112 is biased so that the insert 112 may be engaged with the framing channel 30 without the use of a tool. The insert 112 includes an insert body 113 having a first tab 114 at a first insert end 116 and a second tab 118 at a second insert end 120. The insert 112 is squeezed or pinched at the first and second insert ends 116, 120 to bias the insert 112 so that the first and second tabs 114, 118 may be engaged with the framing channel 30. When the insert 112 is positioned relative to the framing channel 30, the insert is unbiased so that the tabs exert a force against the framing channel 30 to secure the insert 112 to the framing channel 30. The insert body 113 extends from the first channel end 34 to engage the grooved portion 28 of the side guard 24 to secure the first channel end 34 adjacent the first side guard end 38.

Figure 2:
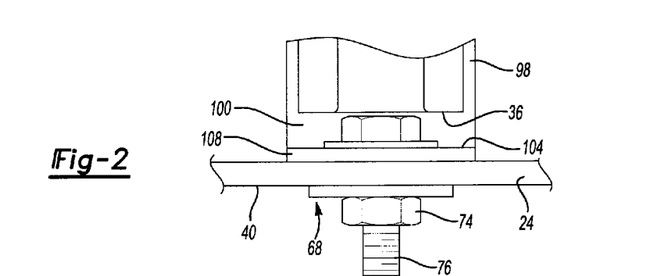
FIG. 2 is an enlarged partial front end view of an exemplary framing channel secured to a side guard of the conveyor system shown in FIG. 1 by partial section 2.

As shown in FIG. 2, a securing device 68 engages the framing channel 30 and the side guard 24 to secure the framing channel 30 to the side guard 24. In the exemplary embodiment, the second side guard end 40 defines at least one end guard opening 70 and the framing channel 30 defines a channel opening 72 that corresponds to the at least one end guard opening 70. Many conveyors 22 have holes on 3-4 inch centers for the attachment of floor supports that can accommodate the framing channel 30 without drilling a hole or opening. If no hole is available, then a single hole can be drilled into the second side guard end 40 to accommodate the securing device 68. The securing device 68 is disposed through each of the at least one end guard openings 70 and the channel opening 72 to secure the framing channel 30 to the side guard 24.

In the exemplary embodiment, the securing device 68 includes a locking nut 74 and a locking bolt 76. The locking bolt 76 is disposed through the framing channel 30 and side guard 24 to mate with the locking nut 74 to secure the framing channel 30 to the side guard 24. More particularly, the locking bolt 76 is disposed through each of the at least one end guard openings 70 and the channel opening 72 to mate with the locking nut 74 to secure the framing channel 30 to the side guard 24.

In an alternative exemplary embodiment, as shown in FIG. 3, the framing channel 30 includes a locking plate 78 that is disposed adjacent the second channel end 36. The locking plate 78 defines the channel opening 72 for receiving the securing device 68 to secure the framing channel 30 to the side guard 24.

In an alternative embodiment, the locking plate 78 defines the channel opening 72 and includes at least one tab 80 that extends outwardly from the locking plate 78 to mate with the end guard opening 70 to secure the framing channel 30 to the side guard 24. In this alternative embodiment, the securing device 68 is not needed and the locking plate 78 is secured to the second side end guard by adjusting the overall length of the assembly to create a tight fit between the locking plate 78 and the second side guard end 40.

As shown in FIGS. 6-9 and 12, the system 20 includes an angle bracket 82, 182 being L-shaped and having a first portion 84, 184 and a perpendicularly extending second portion 86, 186 disposed adjacent the second channel end 36 of the side guard 24. The first portion 84, 184 defines an angle bracket opening 88, 188 and is secured to the framing channel 30 by an angle bracket securing device 90. In the exemplary embodiment of FIG 9, the angle bracket 182 includes a finger portion 92 that extends angularly from the first portion 184 into the channel portion 32 of the framing channel 30.

The angle bracket securing device 90 includes an angle bracket nut portion 94 and an angle bracket bolt portion 96. The angle bracket nut portion 94 is secured within the channel portion 32 of the framing channel 30. The angle bracket bolt portion 96 extends through the angle bracket opening 88, 188, 288 and engages the angle bracket nut portion 94 to secure the angle bracket 82 to the framing channel 30. The angle bracket nut portion 94 may be conventionally provided with a spring 62 to assist in assembly of the angle bracket bolt portion 96 to the angle bracket nut portion 94. The spring 62 biases the angle bracket nut portion 94 to secure the angle bracket nut portion 94 within the channel portion 32 of the framing channel 30. The angle bracket securing device 90 is movable along the framing channel 30 prior to securing the angle bracket bolt portion 96 to the angle bracket nut portion 94. This allows for the position of the angle bracket 82, 182, 282 to be adjusted along the framing channel 30 to vary the overall length of the assembly to a desired length.

As shown in FIGS. 11 and 12, the first portion 284 of the angle bracket 282 may further define an adjustment slot 110. A tool may be inserted into the adjustment slot 110 to move the framing channel 30 relative to the second portion 286 of the angle bracket 282. The tool may be a screw driver, or any other tool known in the art. The tool is inserted through the adjustment slot 110 to engage the second channel end 36. The tool moves the framing channel 30 away from the second portion 286 of the angle bracket 82 by pushing against the second channel end 36. This movement creates tension between the first channel end 34 and the first side guard end 38 as the framing channel 30 moves away from the second portion 286 of the angle bracket 282. In addition, tension is created between the second portion 286 of the angle bracket 282 and the second side guard end 40. The tension in the system 20 further secures the framing channel 30 to the side guard 24.

In an exemplary embodiment, the second portion 86, 186, 286 may define the channel opening 72 that receives the securing device 68 to secure the framing channel 30 to the side guard 24. In an alternative embodiment, as shown in FIGS. 9 and 12, the second portion 286 defines the channel opening 72 and includes at least one tab 80 that extends outwardly from the second portion 286 to mate with the end guard opening 70 to secure the framing channel 30 to the side guard 24. In this alternative embodiment, the securing device 68 is not needed and the second portion 286 is secured to the second side end guard by positioning the angle bracket 282 in a desired position along the framing channel 30 to adjust the overall length of the system 20 to create a tight fit between the second portion 286 of the angle bracket 282 and the second side guard end 40.

Figure 10:
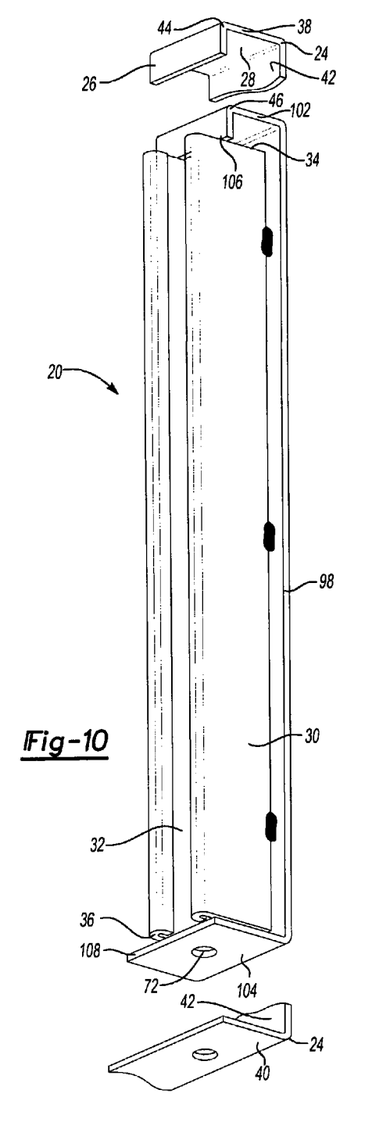
FIG. 10 is a perspective view of an exemplary framing channel of the subject invention.

In an alternative exemplary embodiment, as shown in FIG. 10, the projection portion 46 may be a plate portion 98 having first and second extensions 102, 104. The plate portion 98 extends between a first plate end 106 and a second plate end 108. The plate portion 98 has a length greater than the length of the framing channel 30 and is secured to the bottom of the framing channel 30. The plate portion 98 may be secured by welding the bottom of the framing channel 30 to the plate portion 98 or by any other means known in the art for securing a framing channel 30 to a plate portion 98.

The first extension 102 of the plate portion 98 is adapted adjacent the first channel end 34 to create projection portion 46 that corresponds to and engages the grooved portion 28 of the side guard 24. The first extension 102 may be adapted by bending the first extension 102 of the plate portion 98 to correspond to the grooved portion 28 of the side guard 24.

The plate portion 98 may be further adapted adjacent the second channel end 36 to create the second extension 104 that corresponds to and engages the second side guard end 40 of the side guard 24. The second extension 104 may be adapted by bending the second extension 104 of the plate portion 98 to correspond to the second side guard end 40 of the side guard 24. The plate portion 98 may be adapted by any method known in the art to modify the shape of the plate portion 98 so that it corresponds to the grooved portion 28 or the second side guard end 40 of the side guard 24. The second extension 104 defines the channel opening 72 for receiving the securing device 68 to secure the framing channel 30 to the side guard 24.

In an alternative exemplary embodiment, as shown in FIGS. 14-17, the projection portion 46 is a two tiered biasing adaptor 148 that includes a first adaptor portion 50 and a second adaptor portion 52. The first adaptor portion 50 defines an adaptor opening 54 and is secured to the framing channel 30 by an adaptor securing device 56. The first adaptor portion 50 includes an adaptor body portion 152 that engages the framing channel 30 when the biasing adaptor 148 is secured to the framing channel 30. The second adaptor portion 52 extends from the first adaptor portion 50 to engage to the grooved portion 28. The second adaptor portion 52 includes at least one adaptor arm 150 that extends outwardly from the first adaptor portion 50 to engage the grooved portion 28. In the preferred embodiment, a plurality of adaptor arms 150 extend outwardly from the first adaptor portion 50 to engage the grooved portion 28. The biasing adaptor 148 may be made of any material known in the art, including, but not limited to steel, aluminum, and plastic.

The biasing adaptor 148 further includes a biasing portion 156 that is defined by an adaptor notch in the adaptor body portion 152. The biasing portion 156 includes a biasing wall 158. In the exemplary embodiment, the biasing wall 158 is generally perpendicular to the first channel end 34. Further, the biasing wall 158 spaced from the first channel end 34 to define a void 160 therebetween. During assembly, a tool may be inserted into the void 160 to move the first channel end 34 of the framing channel 30 relative to the biasing adaptor 148. The tool may be a screw driver, or any other tool known in the art. The tool is inserted into the void 160 to engage the first channel end 34. The tool moves the framing channel 30 away from the biasing wall 158 of the biasing adaptor 148 by pushing against the first channel end 34. This movement creates tension between the second channel end 36 and the second side guard end 40 as the framing channel 30 moves away from the biasing wall 158 of the biasing adaptor 148. In addition, tension is created between the first adaptor portion 50 of the biasing adaptor 148 and the first side guard end 38. More specifically, a tight fit is created between the at least one adaptor arm 150 and the grooved portion 28 of the first side guard end 38 as the biasing adaptor 148 is biased away from first channel end 34. The tension in the system 20 further secures the framing channel 30 to the side guard 24.

Figures 14, 15:
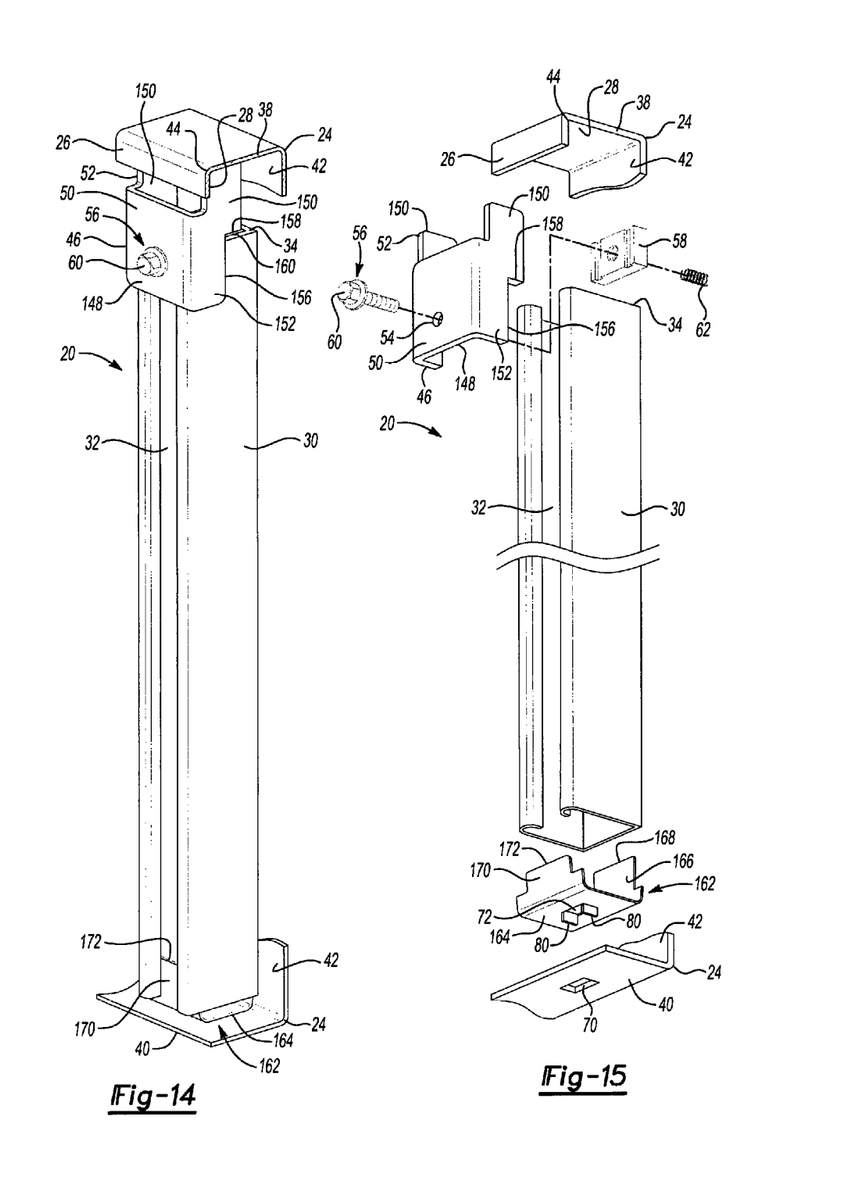
FIG. 14 is a perspective view of an exemplary framing channel of the subject invention.
FIG. 15 is an exploded view of the exemplary framing channel of FIG. 14 of the subject invention.
Figure 16:
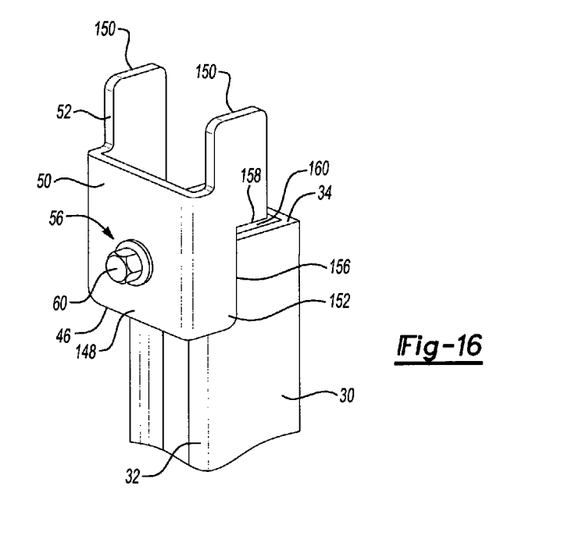
FIG. 16 is a partial perspective view of a biasing adaptor secured to the exemplary framing channel of FIG. 14.

The biasing adaptor 148 may be secured to the framing channel 30 using the adaptor securing device 56 as previously discussed. The adaptor securing device 56 includes an adaptor nut portion 58 and an adaptor bolt portion 60. The adaptor nut portion 58 is secured within the channel portion 32 of the framing channel 30. The adaptor bolt portion 60 extends through the adaptor opening 54 and engages the adaptor nut portion 58 to secure the biasing adaptor 148 to the framing channel 30. The biasing adaptor 148 may be secured to the framing channel 30 by any means known in the art. The adaptor nut portion 58 may be conventionally provided with a spring 62 to assist in assembly of the adaptor bolt portion 60 to the adaptor nut portion 58. The spring 62 biases the adaptor nut portion 58 to secure the adaptor nut portion 58 within the channel portion 32 of the framing channel 30. The biasing adaptor 148 is movable along the framing channel 30 prior to securing the adaptor bolt portion 60 to the adaptor nut portion 58. This allows for the position of the biasing adaptor 148 to be adjusted along the framing channel 30 to vary the overall length of the assembly to a desired length.

Figure 17:
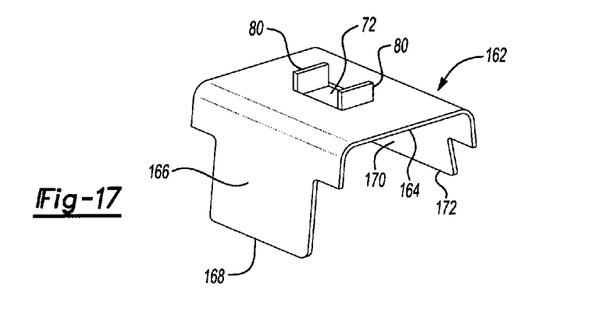
FIG. 17 is a perspective view of a lower insert used according to the subject invention.

In an alternative exemplary embodiment, as shown in FIGS. 14, 15 and 17, a lower insert 162 generally indicated may engage the second channel end 36 to mate the framing channel 30 to the second side guard end 40. The lower insert 162 may be made of any biasing material known in the art, including, but not limited to steel, aluminum, and plastic. In the exemplary embodiment, the lower insert 162 is biased so that the lower insert 162 may be engaged with the framing channel 30 without the use of a tool. The lower insert 162 includes a lower insert body portion 164 having a first tab portion 166 at a first lower insert end 168 and a second tab portion 170 at a second lower insert end 172. The lower insert 162 is squeezed or pinched at the first and second lower insert ends 168, 172 to bias the lower insert 162 so that the first and second tab portions 166, 170 may be engaged with the framing channel 30. When the lower insert 162 is positioned relative to the framing channel 30, the lower insert 162 is unbiased so that the tab portions 166, 170 exert a force against the channel portion 32 to secure the lower insert 162 to the framing channel 30. The lower insert body portion 164 extends from the second channel end 36 to engage the second side guard end 40 of the side guard 24 to secure the second channel end 36 adjacent the second side guard end 40.

The lower insert 162 includes at least one tab 80 that extends outwardly from the lower insert 162 to mate with the end guard opening 70 to secure the framing channel 30 to the side guard 24. In the preferred embodiment, a plurality of tabs 80 extend outwardly from the lower insert 162 to mate with the end guard opening 70 to secure the framing channel 30 to the side guard 24. Further, in the preferred embodiment, the lower insert 162 defines the channel opening 72 and the at least one tab 80 extends outwardly from the periphery of the channel opening 72. In this embodiment, the lower insert 162 is secured to the second side guard end 40 by adjusting the overall length of the assembly to create a tight fit between the lower insert 162 and the second side guard end 40. While the securing device 68 is not needed in the present embodiment, a securing device 68 may be disposed through the channel opening 72 and end guard opening 70 to further secure the framing channel 30 to the side guard 24.

To assemble the attachment system 20, the lower insert 162 is biased and engaged with the second channel end 36 of the framing channel 30. The second channel end 36 of the framing channel 30 is angularly inserted into the framing channel 30 so that the at least one tab 80 is inserted into the end guard opening 70. The first channel end 34 is angularly directed toward the first side guard end 38. Next, the second adaptor portion 52 of the biasing adaptor 148 is angularly inserted to mate with the grooved portion 28 of the side guard 24. The first adaptor portion 50 is rotated towards the framing channel 30 where it may be secured to the framing channel 30 using the adaptor securing device 56. As previously discussed, prior to securing the biasing adaptor 148 to the framing channel 30, the biasing adaptor 148 may be biased away first channel end 34 to increase the tension between the second adaptor portion 52 of the biasing adaptor 148 and the first side guard end 38. Conveyor 22 components are then are secured to the conveyor 22 via the framing channel 30. The conveyor 22 components include, wiring conduit, control boxes, photocell brackets, motor control devices and any other conveyor 22 component known in the art.

The foregoing discussion discloses and describes an exemplary embodiment of the present invention. One skilled in the art will readily recognize from such discussion, and from the accompany drawings and claims that various changes, modifications and variations can be made therein without departing from the true spirit and fair scope of the invention as defined by the following claims.

What is claimed is:
1. An attachment system, comprising:
    a conveyor having a side guard that is generally U-shaped and has first and second side guard ends which extend perpendicularly from opposite ends of a flat wall portion to distal ends;
    said first side guard end having a first lip extending from said distal end of said first side guard end to define a grooved portion;
    said second side guard end defining at least one end guard opening;
    at least one framing channel being generally U-shaped and defining a channel portion for receiving and supporting conveyor components;
    said at least one framing channel extending between a first channel end and a second channel end and being disposed between said first and second side guard ends of said conveyor and;
    said first channel end of said framing channel including a projection portion that engages said grooved portion of said first side guard end to secure said first channel end of said framing channel with said first side guard end of said conveyor; and at least one tab extending outwardly from said second channel end and in parallel with said framing channel, and wherein said at least one tab engages said end guard opening to secure said second channel end of said framing channel to said second side guard end of said conveyor.

2. The attachment system as set forth in claim 1 wherein said projection portion is a biasing adaptor having a first adaptor portion secured to said framing channel and a second adaptor portion extending from said first adaptor portion for engaging said grooved portion of said first side guard end.

3. The attachment system as set forth in claim 2 wherein said framing channel includes an adaptor securing device to secure said biasing adaptor to said framing channel.

4. The attachment system as set forth in claim 3 wherein said first adaptor portion defines an adaptor opening and said adaptor securing device includes an adaptor nut portion secured within said channel portion of said framing channel and an adaptor bolt portion extending through said adaptor opening and engaging said adaptor nut portion to secure said adaptor to said framing channel.

5. The attachment system as set forth in claim 2 wherein said second adaptor portion includes at least one adaptor arm extending from said first adaptor portion for engaging said grooved portion of said first side guard end.

6. The attachment system as set forth in claim 2 wherein said first adaptor portion includes an adaptor body portion for engaging said framing channel.

7. The attachment system as set forth in claim 1 wherein said biasing adapter further includes a biasing portion and wherein said biasing portion includes a biasing wall spaced from said first channel end to define a void therebetween, and wherein said first channel end of said framing channel is moved relative to said biasing adaptor at said void.

8. The attachment system as set forth in claim 7 wherein said biasing wall is generally perpendicular to said first channel end of said conveyor.

9. The attachment system as set forth in claim 1 further including a lower insert having an lower insert body portion extending between first and second lower insert ends and wherein said lower insert body portion extends from said second channel end of said framing channel for engaging said second side guard end of said side guard.

10. The attachment system as set forth in claim 9 wherein said lower insert is biased at said first and second insert ends to engage said channel portion and secure said lower insert to said framing channel.

11. The attachment system as set forth in claim 9 wherein said lower insert body portion includes a first tab portion at said first lower insert end and a second tab portion at said second lower insert end, and wherein said first and second tab portions engage said channel portion to secure said lower insert to said framing channel.

* * * * *